(12) United States Patent
Lainema et al.

(10) Patent No.: US 8,848,801 B2
(45) Date of Patent: Sep. 30, 2014

(54) APPARATUS, A METHOD AND A COMPUTER PROGRAM FOR VIDEO PROCESSING

(75) Inventors: Jani Lainema, Tampere (FI); Kemal Ugur, Tampere (FI)

(73) Assignee: Nokia Corporation, Espoo (FI)

( * ) Notice: Subject to any disclaimer, the term of this patent is extended or adjusted under 35 U.S.C. 154(b) by 740 days.

(21) Appl. No.: 12/986,896

(22) Filed: Jan. 7, 2011

(65) Prior Publication Data

US 2011/0170609 A1 Jul. 14, 2011

Related U.S. Application Data

(60) Provisional application No. 61/293,479, filed on Jan. 8, 2010.

(51) Int. Cl.
*H04N 7/26* (2006.01)
*H04N 19/86* (2014.01)
*H04N 19/14* (2014.01)
*H04N 19/117* (2014.01)
*H04N 19/82* (2014.01)
*H04N 19/61* (2014.01)
*H04N 19/176* (2014.01)
*H04N 19/157* (2014.01)

(52) U.S. Cl.
CPC ... *H04N 19/00781* (2013.01); *H04N 19/00909* (2013.01); *H04N 19/00157* (2013.01); *H04N 19/00066* (2013.01); *H04N 19/00896* (2013.01); *H04N 19/00278* (2013.01); *H04N 19/00212* (2013.01)
USPC ..................................................... 375/240.24

(58) Field of Classification Search
CPC .................. H04N 19/00066; H04N 19/00278; H04N 19/00781; H04N 19/00909; H04N 19/00157; H04N 19/00212; H04N 19/000896
USPC ...................................................... 375/240.24
See application file for complete search history.

(56) References Cited

U.S. PATENT DOCUMENTS

2003/0058944 A1 3/2003 MacInnis et al.
2005/0243912 A1* 11/2005 Kwon et al. ............. 375/240.03

(Continued)

OTHER PUBLICATIONS

"Advanced video coding for generic audiovisual services", Series H: Audiovisual and Multimedia Systems, Infrastructure of audiovisual services—Coding of moving video, ITU-T H.264, Mar. 2009, 670 pages.
International Search Report and Written Opinion, received in corresponding Patent Cooperation Treaty Application No. PCT/IB2011/050073. Dated Apr. 13, 2011. 14 Pages.

(Continued)

*Primary Examiner* — Anner Holder
(74) *Attorney, Agent, or Firm* — Alston & Bird LLP

(57) ABSTRACT

There is disclosed apparatuses, methods and computer program products for coding and decoding and specifically but not only for coding and decoding of image and video signals. It is determined whether two adjacent blocks of pixels of an image have a flat nature. The result of the determining is used to select a filter among at least a first filter and a second filter for filtering a block boundary between two adjacent blocks of pixels. The second filter is selected when said determining indicates that there are two adjacent blocks of pixels having a flat nature. At least a first reference value and a second reference value are selected for the second filter and used in filtering the block boundary.

23 Claims, 10 Drawing Sheets

(56) References Cited

U.S. PATENT DOCUMENTS

| | | | |
|---|---|---|---|
| 2006/0078048 A1 | 4/2006 | Bjontegaard | |
| 2006/0098744 A1* | 5/2006 | Huang | 375/240.29 |
| 2007/0025448 A1* | 2/2007 | Cha et al. | 375/240.24 |
| 2007/0058726 A1 | 3/2007 | Ha et al. | |
| 2008/0095244 A1* | 4/2008 | Kim et al. | 375/240.24 |
| 2009/0097547 A1 | 4/2009 | Ugur et al. | |
| 2010/0177585 A1 | 7/2010 | Rubenstein et al. | |
| 2010/0220215 A1 | 9/2010 | Rubenstein et al. | |
| 2011/0129160 A1* | 6/2011 | Obara | 382/233 |
| 2012/0121013 A1 | 5/2012 | Lainema et al. | |

OTHER PUBLICATIONS

List, P, et al.; "Adaptive Deblocking Filter"; IEEE Transactions on Circuits and Systems for Video Technology, IEEE Service Center, Piscataway, NJ, US; vol. 13, No. 7, Jul. 7, 2003; pp. 614-619; XP011221094.

Chen Y.Y., et al; "Design a Deblocking Filter with Three Separate Modes in DCT-Based Coding"; Journal of Visual Communication and Image Representation, Academic Press, Inc., US; vol. 19, No. 4, May 1, 2008; pp. 231-244; XP022635325.

Extended European Search Report from European Application No. 11731722.2 dated Jul. 3, 2014.

Korean Office Action from Application No. 2012-7020867 dated Jul. 4, 2014.

* cited by examiner

APPARATUS, A METHOD AND A COMPUTER PROGRAM FOR VIDEO PROCESSING

RELATED APPLICATION

This application claims priority to U.S. Application No. 61/293,479 filed Jan. 8, 2010, which is incorporated herein by reference in its entirety.

TECHNICAL FIELD

The present invention relates to an apparatus, a method and a computer program for coding and decoding.

BACKGROUND INFORMATION

A video codec may comprise an encoder which transforms input video into a compressed representation suitable for storage and/or transmission and a decoder that can uncompress the compressed video representation back into a viewable form, or either one of them. Typically, the encoder discards some information in the original video sequence in order to represent the video in a more compact form, for example at a lower bit rate.

Typical video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship.

Prediction approaches using image information from a previous (or a later) image can also be called as Inter prediction methods, and prediction approaches using image information within the same image can also be called as Intra prediction methods.

The second phase is one of coding the error between the predicted block of pixels and the original block of pixels. This is typically accomplished by transforming the difference in pixel values using a specified transform. This transform is typically a Discrete Cosine Transform (DCT) or a variant thereof. After transforming the difference, the transformed difference is quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate). An example of the encoding process is illustrated in FIG. 4a.

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence.

An example of the decoding process is illustrated in FIG. 6.

In typical video codecs, the motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). In order to represent motion vectors efficiently, motion vectors are typically coded differentially with respect to block specific predicted motion vector. In a typical video codec, the predicted motion vectors are created in a predefined way, for example by calculating the median of the encoded or decoded motion vectors of the adjacent blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize the Lagrangian cost function to find optimal coding modes, for example the desired macro block mode and associated motion vectors. This type of cost function uses a weighting factor or $\square$ to tie together the exact or estimated image distortion due to lossy coding methods and the exact or estimated amount of information required to represent the pixel values in an image area.

This may be represented by the equation:

$$C = D + \square R \qquad (1)$$

where C is the Lagrangian cost to be minimised, D is the image distortion (for example, the mean-squared error between the pixel values in original image block and in coded image block) with the mode and motion vectors currently considered, and R is the number of bits needed to represent the required data to reconstruct the image block in the decoder (including the amount of data to represent the candidate motion vectors).

Some hybrid video codecs, such as H.264/AVC, predict the Intra coded areas by spatial means utilizing the pixel values of the already processed areas in the picture. The difference between the predicted pixel values and the original ones is coded in a lossy manner utilizing DCT-like transform. Quantization of the transform coefficients may result in artefacts in the reconstructed video signal. These artefacts are especially visible if the transformed area or part of the transformed area has no high frequency content (that is, the pixel values are almost identical or change gradually over an area). Typical examples of such cases are human faces and sky. These are both characterized by gradual spatial changes in color which is not represented satisfactorily in the decoded video when the operation bitrate is moderately low (resulting in usage of moderate quantization of transform coefficients). The effect can be more severe when the amount of changes in the pixel values is smaller than what can be represented with the quantized AC coefficients of the transform. In this case the picture with gradually changing pixel values will look blocky as its decoded pixel values are represented with the DC coefficient of the transform alone.

In some known constructions the problem with blockiness of the decoded video signal is handled with filtering the image e.g. by using a Finite Impulse Response (FIR) filter. However due to complexity reasons some filters used in video coding utilize a short tap length, which may not be enough to smooth the blocking artefacts in smooth picture areas. This problem is illustrated in FIG. 8c.

SUMMARY

This invention proceeds from the consideration that by substituting the typical FIR post-processing filters with an interpolative process when the picture area has certain characteristics, the processing of flat picture areas or areas with gradually changing pixel values, more pleasant reproduction of the image may be achieved.

Some embodiments of the invention provides video encoders and decoders an efficient mode of operation resulting in visually pleasing decoded pictures even when coarse quantization of DCT coefficients is utilized. This is achieved by omitting the spatial prediction and DCT transform operations for selected areas of the image and defining a spatial surface covering the picture block to be processed, with no or only small discontinuities on the edges of the block, and the image areas already processed. In the case the image blocks are scanned in a typical left-to-right and up-to-down order, the surface can be defined, for example, by sending a single parameter corresponding to the pixel value of the lower right corner of the block being processed and interpolating the rest of the samples.

According to a first aspect of the invention, there is provided an apparatus comprising:
  a determinator configured for determining whether two adjacent blocks of pixels of an image have a flat nature;
  a selector configured for:
  using the result of the determining to select a filter among at least a first filter and a second filter for filtering a block boundary between two adjacent blocks of pixels;
  selecting the second filter when said determining indicates that there are two adjacent blocks of pixels having a flat nature; and
  selecting at least a first reference value and a second reference value for the second filter;
  wherein the second filter is configured for using said first reference value and said second reference value in filtering the block boundary.

According to a second aspect of the invention there is provided a method comprising:
  determining whether two adjacent blocks of pixels of an image have a flat nature;
  using the result of the determining to select a filter among at least a first filter and a second filter for filtering a block boundary between two adjacent blocks of pixels;
  selecting the second filter when said determining indicates that there are two adjacent blocks of pixels having a flat nature;
  selecting at least a first reference value and a second reference value for the second filter; and
  using said first reference value and said second reference value in filtering the block boundary.

According to a third aspect of the invention there is provided a computer readable storage medium stored with code thereon for use by an apparatus, which when executed by a processor, causes the apparatus to perform:
  determine whether two adjacent blocks of pixels of an image have a flat nature;
  use the result of the determining to select a filter among at least a first filter and a second filter for filtering a block boundary between two adjacent blocks of pixels;
  select the second filter when said determining indicates that there are two adjacent blocks of pixels having a flat nature;
  select at least a first reference value and a second reference value for the second filter; and
  use said first reference value and said second reference value in filtering the block boundary.

According to a fourth aspect of the invention there is provided at least one processor and at least one memory, said at least one memory stored with code thereon, which when executed by said at least one processor, causes an apparatus to:
  determine whether two adjacent blocks of pixels of an image have a flat nature;
  use the result of the determining to select a filter among at least a first filter and a second filter for filtering a block boundary between two adjacent blocks of pixels;
  select the second filter when said determining indicates that there are two adjacent blocks of pixels having a flat nature;
  select at least a first reference value and a second reference value for the second filter; and
  use said first reference value and said second reference value in filtering the block boundary.

According to a fifth aspect of the invention there is provided an apparatus which comprises:
  an analyser configured for determining whether two adjacent blocks of pixels of an image have a flat nature;
  a deblocking filter selector configured for
  using the result of the determining to select a deblocking filter among at least a first deblocking filter and a second deblocking filter for filtering a block boundary between two adjacent blocks of pixels;
  selecting the second deblocking filter when said determining indicates that there are two adjacent blocks of pixels having a flat nature; and
  selecting at least a first reference value and a second reference value for the second deblocking filter;
  wherein the second deblocking filter is configured for using said first reference value and said second reference value in filtering the block boundary.

According to a sixth aspect of the invention there is provided a method comprising:
  determining whether two adjacent blocks of pixels of an image have a flat nature;
  using the result of the determining to select a deblocking filter among at least a first deblocking filter and a second deblocking filter for filtering a block boundary between two adjacent blocks of pixels;
  selecting the second deblocking filter when said determining indicates that there are two adjacent blocks of pixels having a flat nature; and
  selecting at least a first reference value and a second reference value for the second deblocking filter; and
  using said first reference value and said second reference value in filtering the block boundary.

According to a seventh aspect of the invention there is provided a computer readable storage medium stored with code thereon for use by an apparatus, which when executed by a processor, causes the apparatus to:
  determining whether two adjacent blocks of pixels of an image have a flat nature;
  using the result of the determining to select a deblocking filter among at least a first deblocking filter and a second deblocking filter for filtering a block boundary between two adjacent blocks of pixels;

selecting the second deblocking filter when said determining indicates that there are two adjacent blocks of pixels having a flat nature;
selecting at least a first reference value and a second reference value for the second deblocking filter; and
using said first reference value and said second reference value in filtering the block boundary.

According to an eighth aspect of the invention there is provided at least one processor and at least one memory, said at least one memory stored with code thereon, which when executed by said at least one processor, causes an apparatus to:
determine whether two adjacent blocks of pixels of an image have a flat nature;
use the result of the determining to select a deblocking filter among at least a first deblocking filter and a second deblocking filter for filtering a block boundary between two adjacent blocks of pixels;
select the second deblocking filter when said determining indicates that there are two adjacent blocks of pixels having a flat nature; and
select at least a first reference value and a second reference value for the second deblocking filter; and
use said first reference value and said second reference value in filtering the block boundary.

According to a ninth aspect of the invention there is provided an encoder comprising:
a determinator configured for determining whether two adjacent blocks of pixels of an image have a flat nature;
a selector configured for:
using the result of the determining to select a filter among at least a first filter and a second filter for filtering a block boundary between two adjacent blocks of pixels;
selecting the second filter when said determining indicates that there are two adjacent blocks of pixels having a flat nature; and
selecting at least a first reference value and a second reference value for the second filter;
wherein the second filter is configured for using said first reference According to a tenth aspect of the invention there is provided a decoder which comprises:
an analyser configured for determining whether two adjacent blocks of pixels of an image have a flat nature;
a deblocking filter selector configured for
using the result of the determining to select a deblocking filter among at least a first deblocking filter and a second deblocking filter for filtering a block boundary between two adjacent blocks of pixels;
selecting the second deblocking filter when said determining indicates that there are two adjacent blocks of pixels having a flat nature; and
selecting at least a first reference value and a second reference value for the second deblocking filter;
wherein the second deblocking filter is configured for using said first reference value and said second reference value in filtering the block boundary.

According to an eleventh aspect of the invention there is provided an apparatus which comprises:
means for determining whether two adjacent blocks of pixels of an image have a flat nature;
means for using the result of the determining to select a filter among at least a first filter and a second filter for filtering a block boundary between two adjacent blocks of pixels;
means for selecting the second filter when said determining indicates that there are two adjacent blocks of pixels having a flat nature; and
means for selecting at least a first reference value and a second reference value for the second filter;
means for using said first reference value and said second reference value in filtering the block boundary.

According to a twelfth aspect of the invention there is provided an apparatus which comprises:
means for determining whether two adjacent blocks of pixels of an image have a flat nature;
means for using the result of the determining to select a deblocking filter among at least a first deblocking filter and a second deblocking filter for filtering a block boundary between two adjacent blocks of pixels;
means for selecting the second deblocking filter when said determining indicates that there are two adjacent blocks of pixels having a flat nature;
means for selecting at least a first reference value and a second reference value for the second deblocking filter; and
means for using said first reference value and said second reference value in filtering the block boundary.

DESCRIPTION OF THE DRAWINGS

For better understanding of the present invention, reference will now be made by way of example to the accompanying drawings in which.

DETAILED DESCRIPTION OF SOME EXAMPLE EMBODIMENTS OF THE INVENTION

Figure 1:
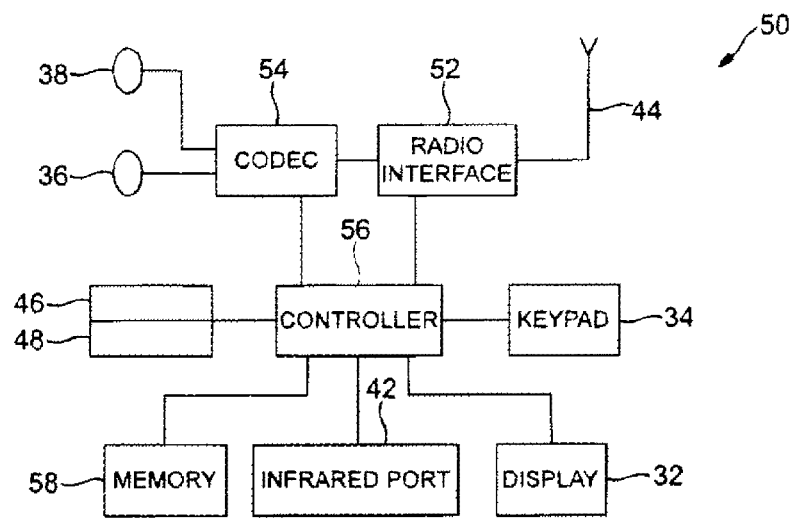
FIG. 1 shows schematically an electronic device employing some embodiments of the invention.
Figure 2:
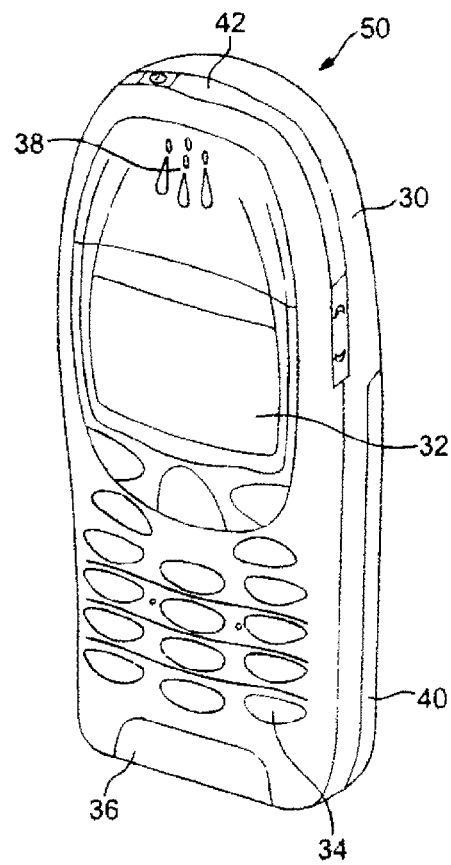
FIG. 2 shows schematically a user equipment suitable for employing some embodiments of the invention FIG. 3 further shows schematically electronic devices employing embodiments of the invention connected using wireless and wired network connections.

The following describes in further detail suitable apparatus and possible mechanisms for the provision of enhancing encoding efficiency and signal fidelity for a video codec. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 3:
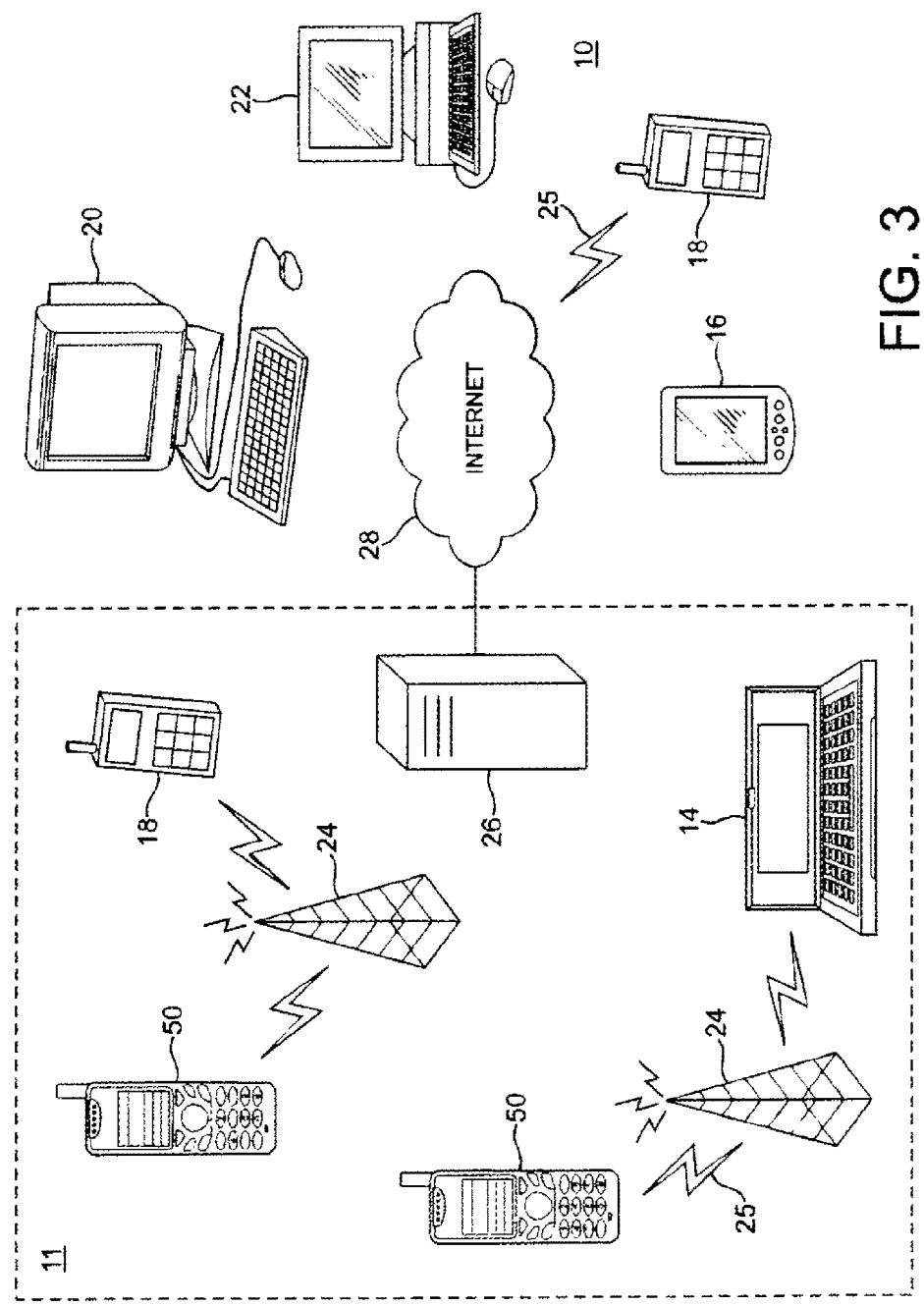

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
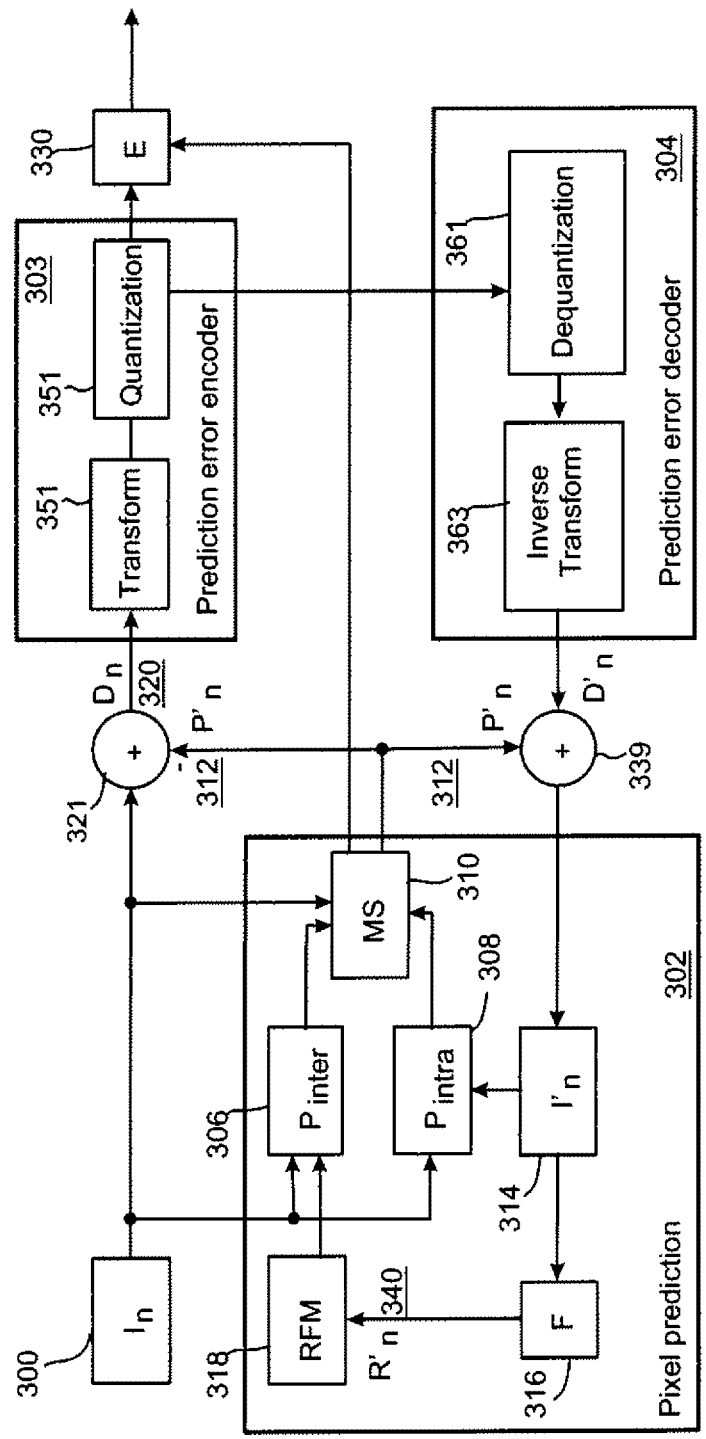
FIGS. 4a and 4b show schematically an embodiment of the invention as incorporated within an encoder.

With respect to FIG. 4a, a block diagram of a video encoder suitable for carrying out embodiments of the invention is shown. Furthermore, with respect to FIGS. 5a and 5b, the operation of the encoder exemplifying embodiments of the invention specifically with respect to the interpolation of the selected surface area is shown in detail.

Figure 4B:
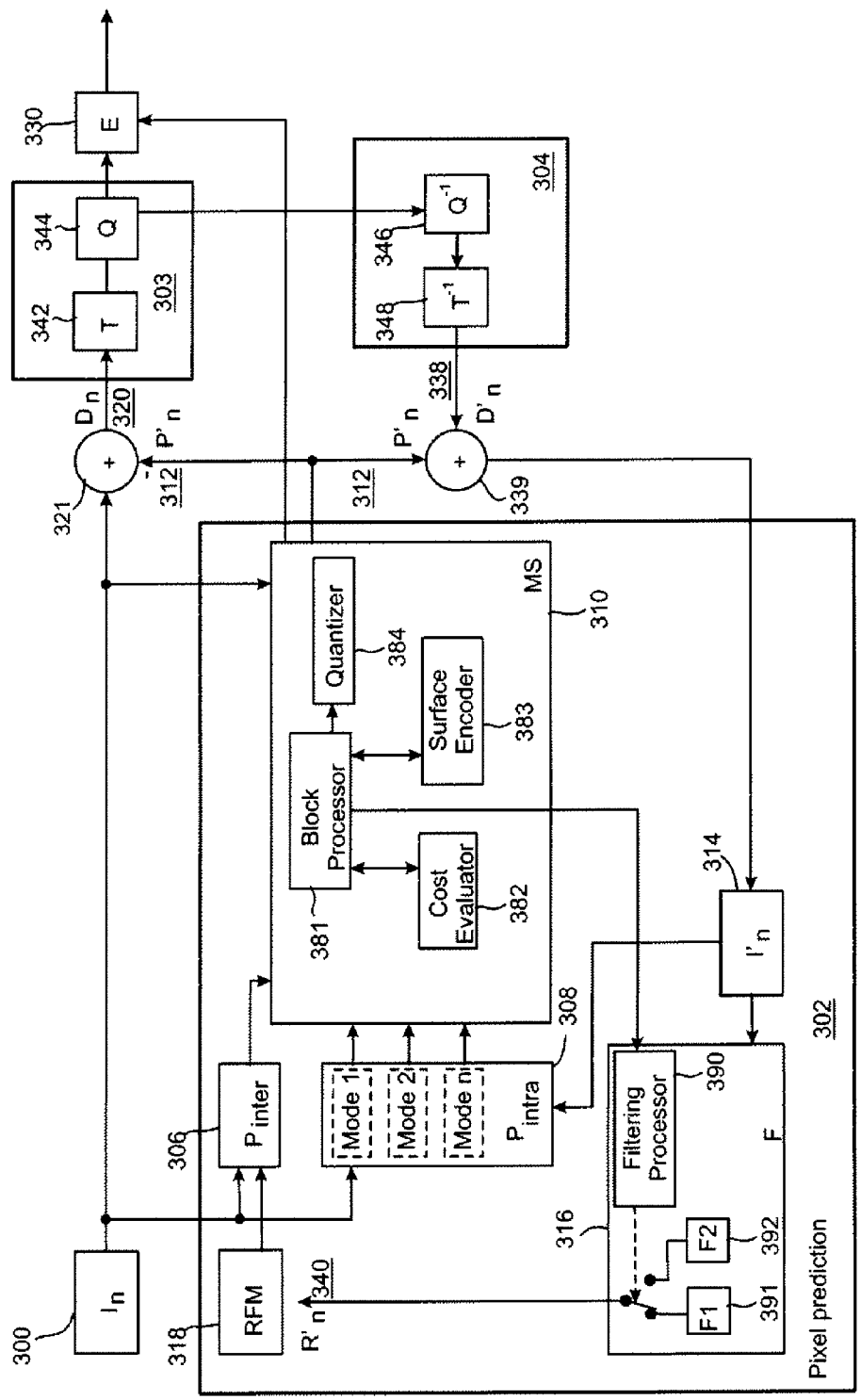

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. FIG. 4b depicts the filtering block 316 of an example embodiment of the encoder in more detail. The filtering block 316 comprises a filtering processor 390, a first filter 391 and a second filter 392. Also an example embodiment of the mode selector 310 is depicted in FIG. 4b. The mode selector 310 comprises a block processor 381, a cost evaluator 382 and a surface encoder 383. FIG. 4b also depicts an embodiment of the intra-predictor 308 which comprises a plurality of different intra-prediction modes: Mode 1, Mode 2, . . . , Mode n. The mode selector 310 may also comprise a quantizer 384. It should be noted here that the filtering processor 390 and the block processor 381 may be separate processors or they may be implemented within one processor. The operations of the block processor 381 and the filtering processor 390 can be implemented as a program code.

In some embodiments the block processor 381 is not used but the nature of the image content of the blocks can be determined e.g. by the filtering processor 390 or by some other means.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode it will pass the output of one of the optional intra-predictor modes to the output of the mode selector 310. In a situation in which the mode selector 310 decides to use a surface coding mode it will pass the output of the surface encoder 383 to the output of the mode selector 310. Some example embodiments on the decision of the encoding mode will be discussed later in this application.

The output of the mode selector 310 is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations.

The operation of the pixel predictor 302 may be configured to carry out any known pixel prediction algorithm known in the art.

The output of the mode selector 310 may also be passed to the filtering block which may store the information regarding the selected encoding mode of the block e.g. to the memory 58 for later use.

The operation of the prediction error encoder 302 and prediction error decoder 304 will be described hereafter in further detail. In the following examples the encoder generates images in terms of 16×16 pixel macroblocks which go to form the full image or picture. Thus, for the following examples the pixel predictor 302 outputs a series of predicted macroblocks of size 16×16 pixels and the first summing device 321 outputs a series of 16×16 pixel residual data macroblocks which may represent the difference between a first macro-block in the image 300 against a predicted macroblock (output of pixel predictor 302). It would be appreciated that other size macro blocks may be used.

The prediction error encoder 303 comprises a transform block 342 and a quantizer 344. The transform block 342 transforms the first prediction error signal 320 to a transform domain. The transform is, for example, the DCT transform. The quantizer 344 quantizes the transform domain signal, e.g. the DCT coefficients, to form quantized coefficients.

The entropy encoder 330 receives the output of the prediction error encoder and may perform a suitable entropy encoding/variable length encoding on the signal to provide error detection and correction capability. Any suitable entropy encoding algorithm may be employed.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal and an inverse transformation block 348, which performs the inverse transformation to the reconstructed transform signal wherein the output of the inverse transformation block 348 contains reconstructed block(s). The prediction error decoder may also comprise a macroblock filter which may filter the reconstructed macroblock according to further decoded information and filter parameters.

Figure 8A:
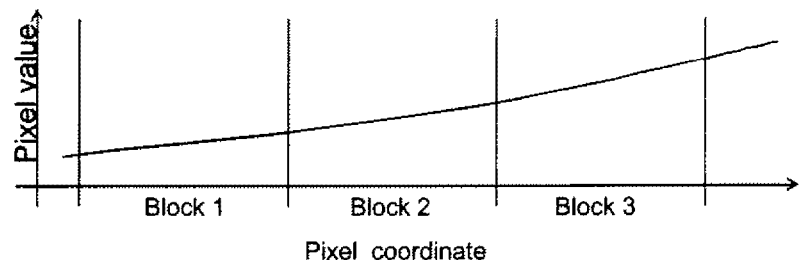
FIG. 8a depicts an example of a part of a one dimensional signal having only moderate changes in pixel values.
Figure 8B:
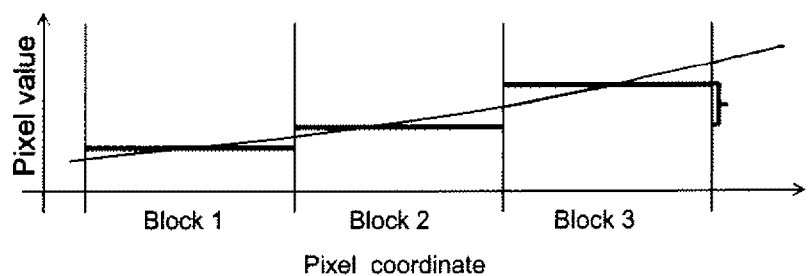
FIG. 8b depicts the signal of FIG. 8a encoded by using a known method and coding the DC component of a DCT transformed difference signal before applying a deblocking filter.
Figure 8C:
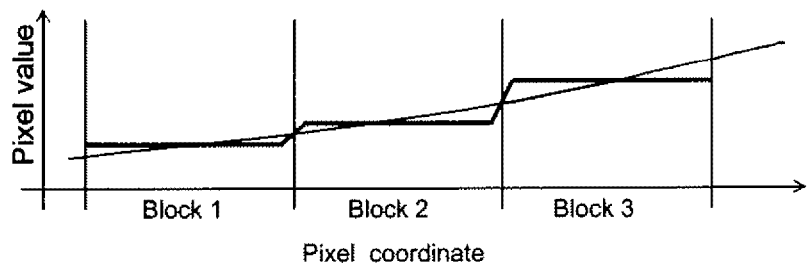
FIG. 8c depicts the signal of FIG. 8a encoded by using a known method and coding the DC component of a DCT transformed difference signal after applying a deblocking filter.

FIGS. 8a-8c demonstrate the effect a deblocking filter may cause to a region of an image containing only small changes in pixel values. The x-axes illustrates the pixel coordinates and the y-axis illustrate the pixel values. In FIG. 8a an example of a part of a one dimensional signal is depicted. The pixel values are slightly growing from block to block and within the blocks 1, 2 and 3. In FIG. 8b the image signal of FIG. 8a has been encoded utilizing a known method and coding the DC component of a DCT transformed difference signal before applying a deblocking filter. In FIG. 8c the image signal of FIG. 8a has been coded with a known method and coding the DC component of a DCT transformed difference signal after applying a deblocking filter. From FIG. 8c it can be seen that the deblocking filter has modified the pixels across the block boundaries so that there is no sharp edge at the boundary but the difference between encoded signals at both sides of the block boundary has been slightly smoothened by the deblocking filter. However, there still exists some blocking artefacts across the block boundaries.

Figure 5:
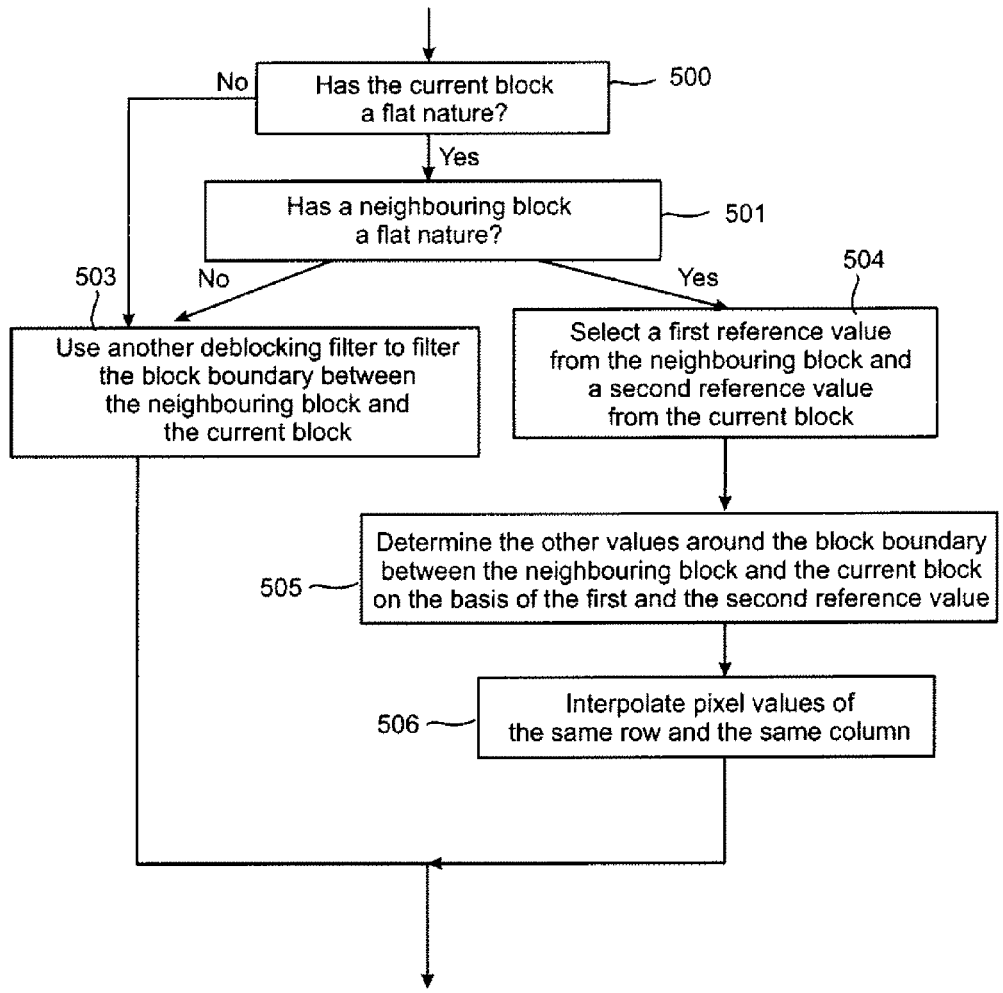
FIG. 5 shows a flow diagram showing the operation of an embodiment of the invention with respect to the encoder as shown in FIGS. 4a and 4b.

The operation and implementation of the filtering mode selection is shown in further detail with respect to FIG. 5. On the basis of the mode selection signal 370 of the mode selector 310 the filtering mode selector chooses one of the filtering modes. There may be two or more filtering modes from which the filtering mode may be selected. The first filtering mode 391 may be a known deblocking filter e.g. a finite impulse response filter and the second filtering mode 392 may comprise an embodiment of the filtering according to the present invention. The mode selector 310 determines which encoding mode to use to encode the current image block and provides this indication to the filtering processor 390. The filtering processor 390 may use this indication to determine whether the current block has a flat nature (block 500 in FIG. 5).

When the filtering processor 390 receives an indication that the encoding mode selected for the current block is the surface coding mode, it will examine whether the already encoded neighbouring block was also encoded by the surface encoding mode (block 501). If the surface coding mode was selected for both the current block and the neighbouring block the filtering processor 390 selects the second filter 392 for filtering the pixel values of the current block. Otherwise the filtering processor 390 may select the first filter 391 or another filter (block 503).

Figure 9A:
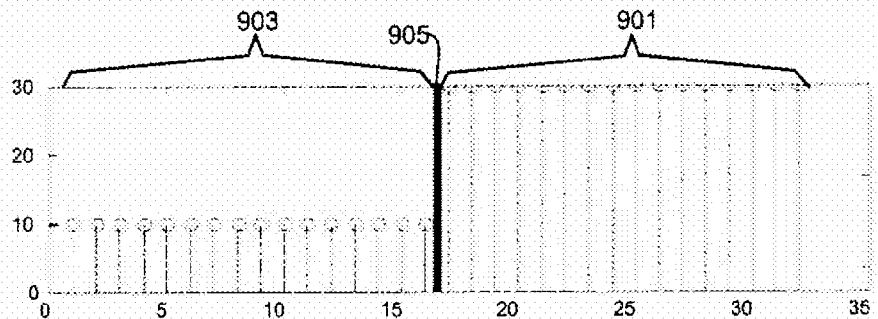
FIG. 9a depicts an example of a part of a one dimensional signal only having a blocking artifact across the block boundary.

In addition to or instead of the information regarding the encoding mode the filtering processor 390 may use other ways to determine whether the current block has a flat nature or whether the current block has gradually and substantially uniformly changing pixel values. In other words, the block can be regarded as flat if all pixel values within the block are substantially the same or almost the same. An example of such situation is depicted in FIG. 9a in which pixel values of the block to the left of the block boundary 905 are the same. Also the pixel values of the block to the right of the block boundary 905 are the same although different from the pixel values of the left block. A gradually changing pixel values means that the pixel values form a kind of a slope.

There are also other ways to determine whether the blocks could be classified as flat than by analyzing their corresponding modes. For example, coded coefficients, transform size used for the blocks within the macroblock, reconstruction values and other available information may be used.

When the filtering processor 390 detects that both the current block and the neighbouring block have a flat nature or that pixel values are gradually changing, the filtering processor 390 selects the second filter 392 for filtering the pixel values around the block boundary between the current block and the adjacent, already encoded block.

Figure 9B:
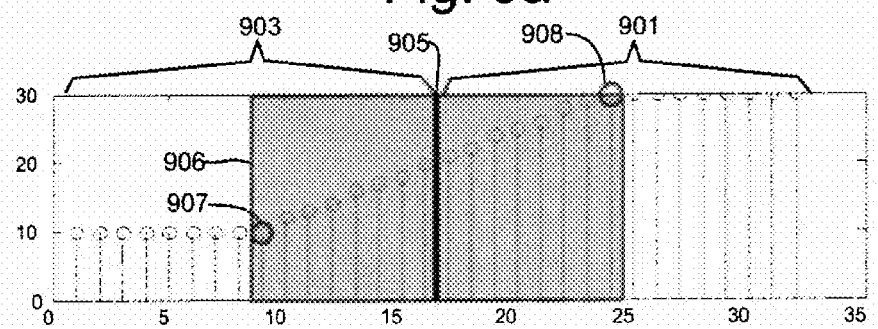
FIG. 9b depicts the signal of FIG. 9a after applying an example embodiment of the present invention.

In the following some example embodiments of the block boundary filtering according to the present invention will be disclosed in more detail with reference to FIGS. 9a-9f. These figures illustrate the situation in which the image signal is one-dimensional but similar principles can be implemented with a two-dimensional images as well. The second filter 392 uses pixel values at both sides of the block boundary 905. The second filter 392 reads e.g. from the frame memory 318 one or more pixel values of the neighbouring block and receive pixel values of the current block i.e. pixel values of the preliminary reconstructed image 314. In FIGS. 9a-9e the block on the left side of the block boundary 905 illustrates pixel values of the neighbouring block and the block on the right side of the block boundary 905 illustrates pixel values of the current, preliminary reconstructed image block. The second filter 392 may use a filtering window (illustrated as the grey rectangle 906 in FIGS. 9b, 9d and 9e). The filtering window indicates which pixel values of the blocks around the block boundary may be affected by the filtering. The number of pixels affected in the blocks may be the same, or more pixels from the neighbouring block than the current block may be affected, or more pixels from the current block than the neighbouring block may be affected. In some example embodiments the second filter 392 may define the values of eight pixels from the neighbouring block and eight pixels of the current block as is depicted in FIG. 9b. In some other example embodiments the second filter 392 may use nine pixels from the neighbouring block and eight pixels from the current block.

In some embodiments the second filter 392 selects the leftmost value inside the filtering window as a first reference value 907 and the rightmost value inside the filtering window as a second reference value 908 (block 504). The other values inside the filtering window 906 may be determined on the basis of the first reference value 907 and the second reference value 908 (block 505). In some example embodiments the other pixel values are determined by interpolating from the first reference value 907 to the second reference value 908 (block 506). In some other embodiments the other pixel values are determined by using another algorithm which utilizes the first reference value 907 and the second reference value 908.

The second filter 392 determines the values of the pixels within the filtering window 906 and stores the filtered values into the frame memory 318.

It should be noted here that the term filtering window is introduced mainly for clarifying the specification but in practical implementations there need not be a filtering window but the filtering processor 390 may use e.g. parameters stored into the memory or into a program code which indicate what pixel is to be used to get the first reference value and what pixel is to be used to get the second reference value.

In the example of FIG. 9b the image signal of FIG. 9a has been filtered by the second filter 392. In this example the value of the eighth pixel (in the neighbouring block) to the left from the block boundary has been used as the first reference value 907 and the value of the eighth pixel (in the current block) to the right from the block boundary has been used as the first reference value 908.

Figure 9C:
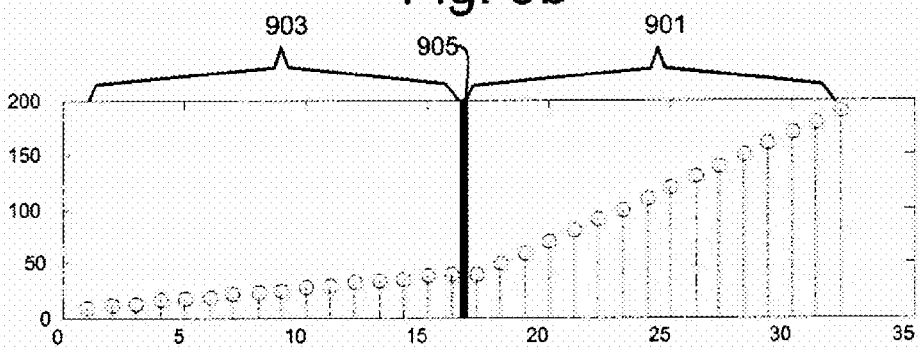
FIG. 9c depicts an example of a part of a one dimensional signal coded with a surface coding mode and having a blocking artifact across the block boundary.
Figure 9D:
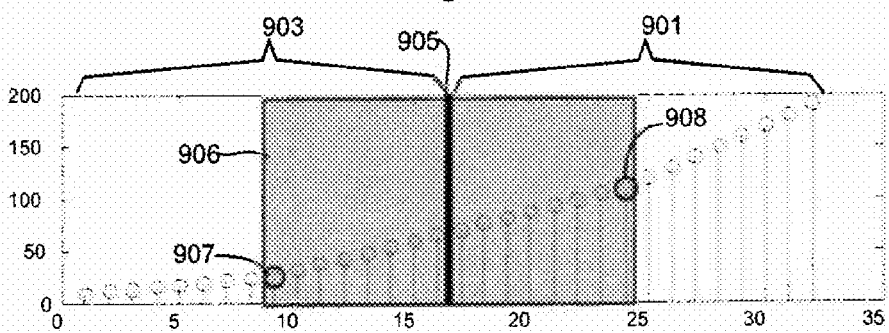
FIG. 9d depicts the signal of FIG. 9c after applying an example embodiment of the present invention.

In the example of FIG. 9d the image signal of FIG. 9c has been filtered by the second filter 392. Also in this example the value of the eighth pixel (in the neighbouring block) to the left from the block boundary has been used as the first reference value 907 and the value of the eighth pixel (in the current block) to the right from the block boundary has been used as the first reference value 908. In this example both blocks have been encoded by the surface encoding mode.

Figure 9E:
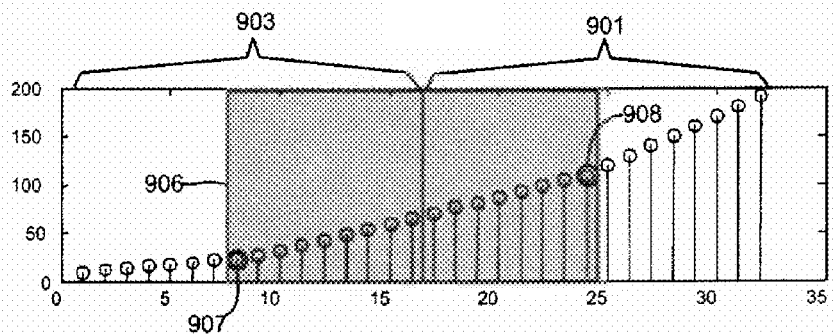
FIG. 9e depicts the signal of FIG. 9c after applying another example embodiment of the present invention.

In the example of FIG. 9e the image signal of FIG. 9c has been filtered by the second filter 392. In this example the value of the ninth pixel (in the neighbouring block) to the left from the block boundary has been used as the first reference value 907 and the value of the eighth pixel (in the current block) to the right from the block boundary has been used as the first reference value 908.

Figure 9F:
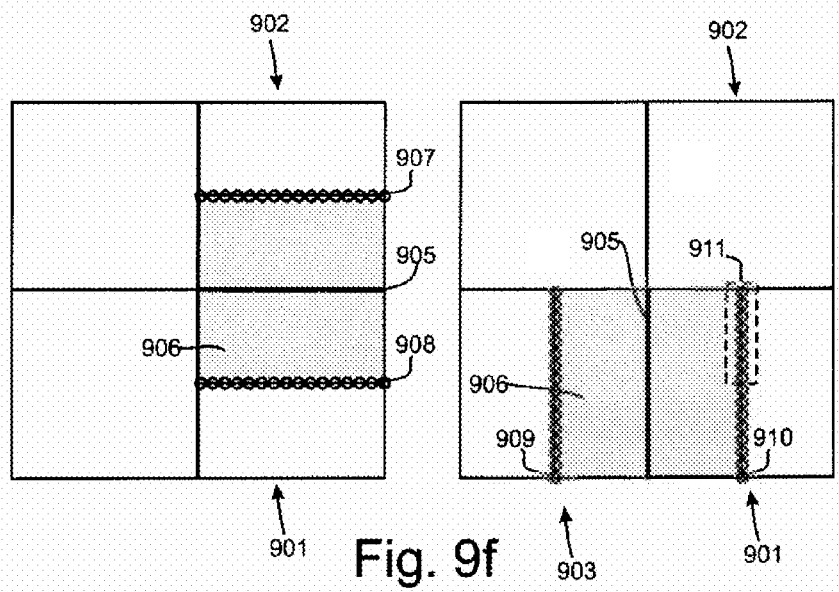
FIG. 9f depicts an example of applying the present invention to a two dimensional signal.
Figure 10:
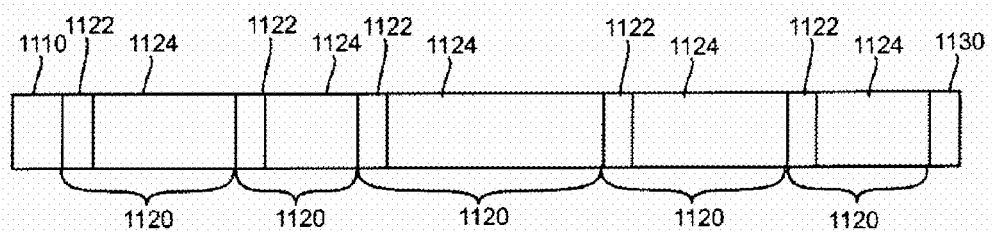
FIG. 10 shows an example of a bit stream containing image information encoded by a method according to an example embodiment of the present invention.

In a two-dimensional image the operation is quite similar to the operation described above except that there may be two block boundaries to be filtered and both filterings may have common pixels. FIG. 9f illustrates this situation. The current block 901 may have two block boundaries between two different neighbouring blocks 902, 903 which may have already been encoded. In such a situation the second filter 392 may filter the horizontal boundary first, i.e. the boundary between the current block and the neighbouring block 902 above the current block, and then the vertical boundary i.e. the boundary between the current block and the neighbouring block 903 on the left side of the current block, or the second filter 392 may filter the vertical boundary first and then the horizontal boundary. The filtering window 906 may be the same for both boundaries or the second filter 392 may use a different filtering window 906 for different boundaries. In practice the filtering processor 390 may select the first reference value 907 and the second reference value 908 for each column and apply the deblocking filtering by the second filter in a column-wise manner so that for each column the corresponding first reference value 907 and the second reference value 908 are used. Respectively, in the vertical block boundary filtering the filtering processor 390 may select a third reference value 909 and a fourth reference value 910 for each column and apply the deblocking filtering by the second filter in a row-wise manner so that for each column the corresponding third reference value 909 (which is analogous to the first reference value 907 in the one-dimensional signal case) and the fourth reference value 908 (which is analogous to the second reference value 908 in the one-dimensional signal case) are used.

In the two-dimensional filtering there are some pixels are affected by the block boundary filtering and which may be used as the second (or fourth) reference values when filtering the other direction. For example, if the horizontal block boundary filtering is applied first, the pixels at the same column from which the second filter 392 is instructed to select the fourth reference values (illustrated by the dashed rectangle 911 in FIG. 9f) may be affected by the horizontal block boundary filtering. Therefore, the second filter 392 may use the filtered pixel values when selecting the fourth reference values for filtering the rows in the vertical block boundary filtering, or the second filter 392 may use the reconstructed pixel values (i.e. pixel values before the filtering has been applied) when selecting the fourth reference values for filtering the rows in the vertical block boundary filtering.

In FIG. 9f the left side illustrates the horizontal block boundary filtering and the right side illustrates the vertical block boundary filtering. It can be seen that, in addition to the above mentioned reference values, there are also other pixel locations which are covered by the filtering window in both directions i.e. the horizontal block boundary filtering and vertical boundary filtering. The filtered values of such pixels may be a combination of pixel values obtained by the horizontal block boundary filtering and vertical boundary filtering, or the second filter 392 may select to use one of the pixel values i.e. the pixel value obtained by the horizontal block boundary filtering or the pixel value obtained by the vertical boundary filtering. In some example embodiments the second filter 392 outputs an average of the pixel values obtained by the horizontal block boundary filtering and the vertical boundary filtering.

The indication of the value of the control point may also include coordinates of the control point but in some embodiments the location of the control point is predetermined wherein it is not necessary to include the indication of the location of the control point in the bitstream and transmit it to the decoder. In a situation in which there are more than one control point, which have predetermined locations in an image block, the block processor 381 may include an index of the control point and the delta value (or the real value) of the control point into the bit stream wherein the decoder can use the index to distinguish delta values of each control point from each other.

In some embodiments the interpolation may be combined with various kinds of filters and the reference pixels used in the process may be also filtered.

In an example embodiment, as is depicted in FIG. 11, the bit stream of an image comprises an indication of the beginning of an image 1110, image information of each block of the image 1120, and indication of the end of the image 1130. The image information of each block of the image 1120 may include the indication of the prediction mode 1122, and the indication of pixel values of the block 1124 which may actually include coefficients of the residual signal when the inter- or intra-prediction has been used for the image block. If the surface coding mode has been used, the indication of pixel values of the block 1124 may include the (quantized and encoded) delta value(s) of the control point(s). It is obvious that the bit stream may also comprise other information. Further, this is only a simplified image of the bit stream and in practical implementations the contents of the bit stream may be different from what is depicted in FIG. 11.

The bit stream may further be encoded by the entropy encoder 330.

Figure 6:
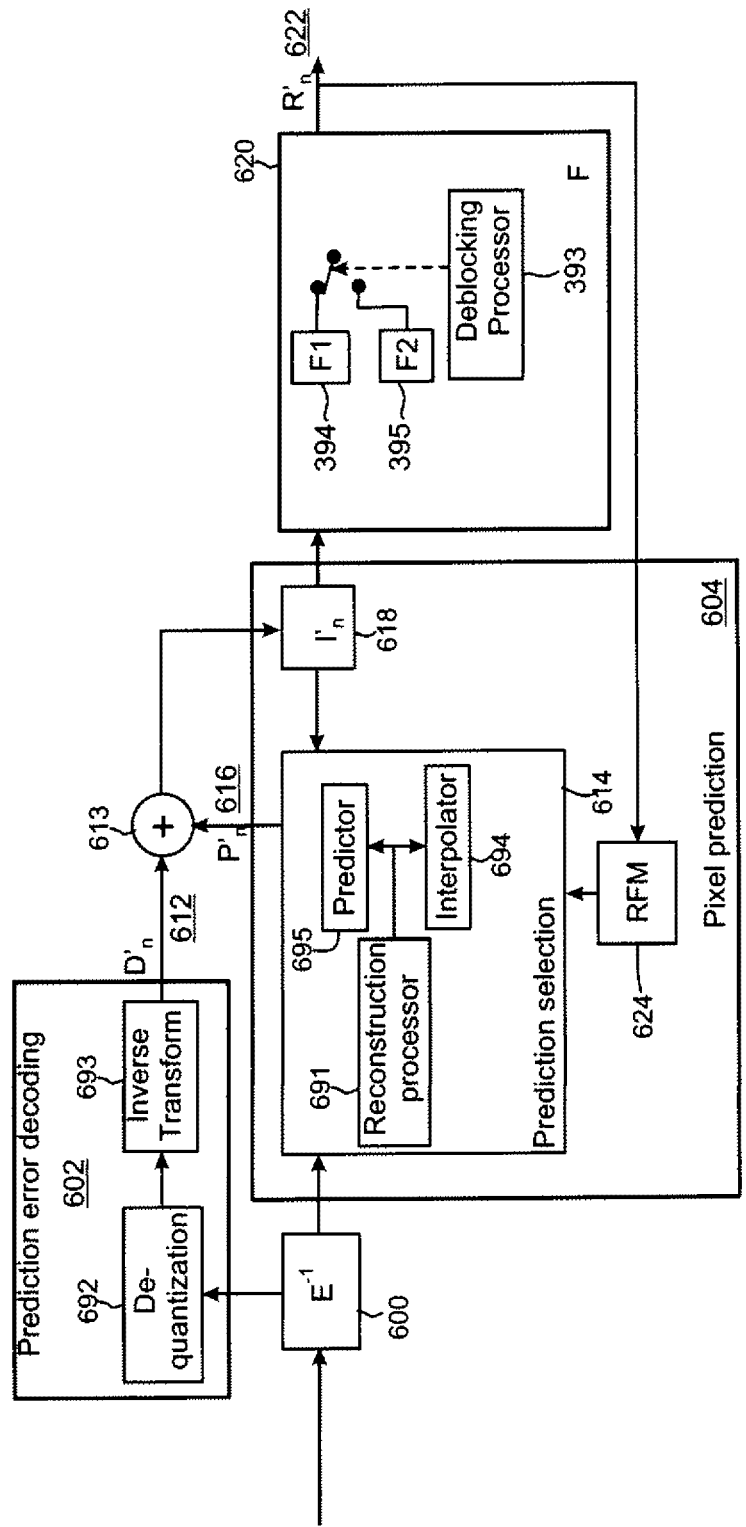
FIG. 6 shows a schematic diagram of a decoder according to some embodiments of the invention.

In the following the operation of an example embodiment of the decoder 600 is depicted in more detail with reference to FIG. 6.

Although the embodiments above have been described with respect to the size of the macroblock being 16×16 pixels, it would be appreciated that the methods and apparatus described may be configured to handle macroblocks of different pixel sizes.

For completeness a suitable decoder is hereafter described. At the decoder side similar operations are performed to reconstruct the image blocks. FIG. 6 shows a block diagram of a video decoder suitable for employing embodiments of the invention. The decoder shows an entropy decoder 600 which performs an entropy decoding on the received signal. The entropy decoder thus performs the inverse operation to the entropy encoder 330 of the encoder described above. The entropy decoder 600 outputs the results of the entropy decoding to a prediction error decoder 602 and pixel predictor 604.

The pixel predictor 604 receives the output of the entropy decoder 600. A predictor selector 614 within the pixel predictor 604 determines that an intra-prediction, an inter-prediction, or interpolation operation is to be carried out. The predictor selector may furthermore output a predicted representation of an image block 616 to a first combiner 613. The predicted representation of the image block 616 is used in conjunction with the reconstructed prediction error signal 612 to generate a preliminary reconstructed image 618. The preliminary reconstructed image 618 may be used in the predictor 614 or may be passed to a filter 620. The filter 620 applies a filtering which outputs a final reconstructed signal 622. The final reconstructed signal 622 may be stored in a reference frame memory 624, the reference frame memory 624 further being connected to the predictor 614 for prediction operations.

The prediction error decoder 602 receives the output of the entropy decoder 600. A dequantizer 692 of the prediction error decoder 602 may dequantize the output of the entropy decoder 600 and the inverse transform block 693 may perform an inverse transform operation to the dequantized signal output by the dequantizer 692. The output of the entropy decoder 600 may also indicate that prediction error signal is not to be applied and in this case the prediction error decoder produces an all zero output signal. This is the case for example with the example embodiment of this invention. However some other embodiments of the invention apply prediction error decoder unit to decode a non-zero prediction error signal.

The decoder selects the 16×16 pixel residual macroblock to reconstruct. The selection of the 16×16 pixel residual macroblock to be reconstructed is shown in step 700.

The decoder may receive information on the encoding mode used when the current block has been encoded. If the indication is received, it is decoded, when necessary, and provided to the reconstruction processor 691 of the prediction selector 614. The reconstruction processor 691 examines the indication and selects the intra-prediction mode, if the indication indicates that the block has been encoded using intra-prediction, inter-prediction mode, if the indication indicates that the block has been encoded using inter-prediction, or the surface coding mode, if the indication indicates that the block has been encoded using interpolation.

Figure 7:
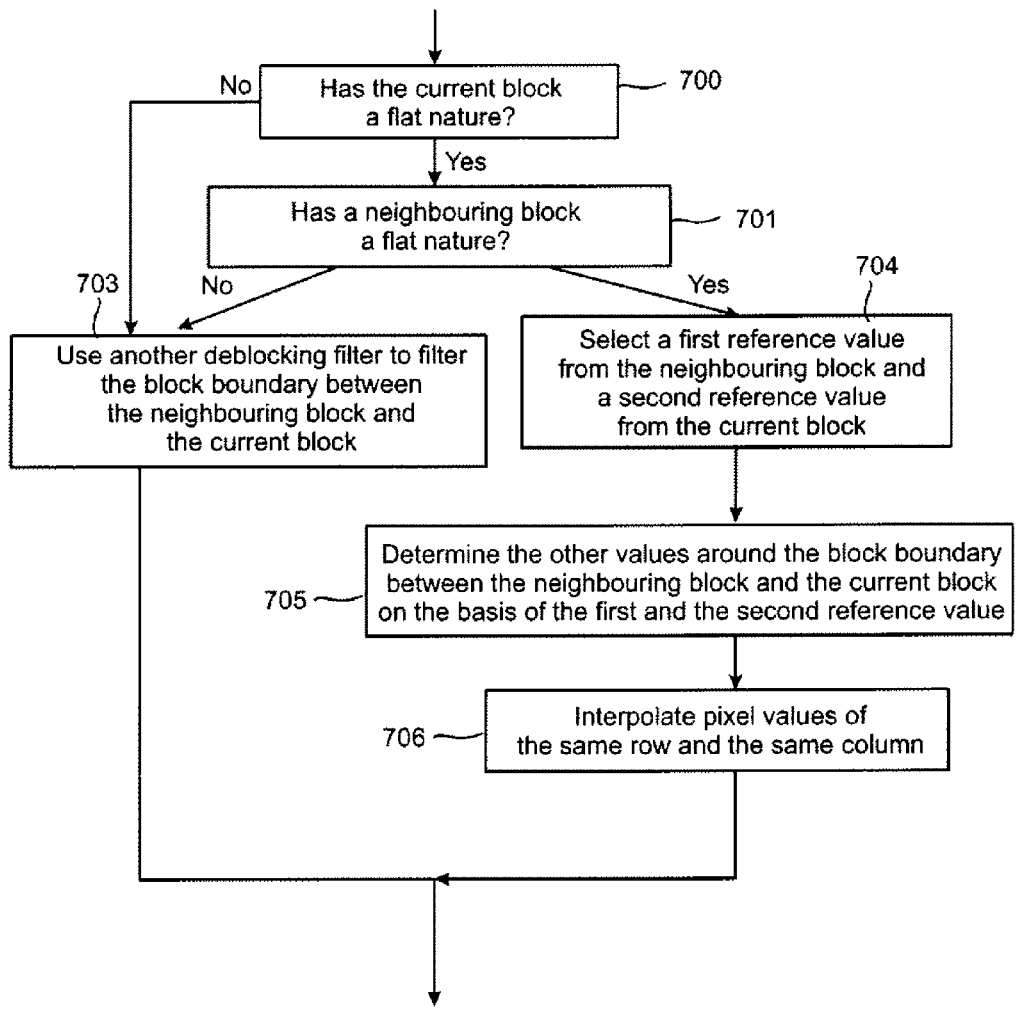
FIG. 7 shows a flow diagram of showing the operation of an embodiment of the invention with respect to the decoder shown in FIG. 6.

The indication of the mode selected for the decoding of the current block may be stored to the memory 58 to provide the indication to the deblocking processor 393 of the decoder, or the indication may be directly provided to the deblocking processor 393 of the decoder. It is also possible that the deblocking processor 393 of the decoder determines whether the current block and a previously reconstructed neighbouring block have a flat nature or not. In this case it may not be necessary to provide the indication to the deblocking processor 393 (blocks 700 and 701 in FIG. 7). If both the neighbouring block and the current block has a flat nature, the deblocking processor 393 may select the second filter 395 to perform similar filtering operations to the block boundary than the second filter 392 of the encoder has performed and which was discussed above (blocks 704, 705 and 706). Otherwise, the deblocking processor 393 may select the first filter 396 of the decoder or another filter to perform the deblocking filtering (block 703).

In some embodiments the deblocking filtering according to the present invention may be applied only in the encoder or in the decoder. If the filtering is applied in the encoder the encoded signal may already have reduced blocking artefacts wherein the decoder may perform a finite impulse filtering at all block boundaries.

In some embodiments the deblocking filtering is not performed during the encoding or decoding process but it may be applied after the whole image has been encoded or reconstructed, before a next image will be processed.

In some embodiments the deblocking filtering according to the present invention is implemented as a post-filter wherein the filtered image is not stored into the reference frame memory 318 of the encoder or into the reference frame memory 624 of the decoder.

It is noted here that the filtering can be applied to a number of different color components independently, wherein pixel values of each color component are interpolated with no reference to other color components, or jointly, wherein the interpolation may be applied to a combination of the color components.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

What is claimed is:

1. An apparatus comprising at least one processor and at least one memory including computer program code, the at least one memory and the computer program code configured to, with the processor, cause the apparatus to at least:
   determine whether two adjacent blocks of pixels of an image have a flat nature;
   use the result of the determining to select a filter among at least a first filter and a second filter for filtering a block boundary between two adjacent blocks of pixels;
   select the second filter when said determining indicates that there are two adjacent blocks of pixels having a flat nature; and
   select at least a first reference value and a second reference value for the second filter, wherein the first reference value is a leftmost value in a filter window and the second reference value is a rightmost value in the filter window;
   wherein the second filter is configured for using said first reference value and said second reference value in filtering the block boundary.

2. An apparatus of claim 1, wherein said block of pixels may comprise at least one row of pixels, and the at least one memory and the computer program code are further configured to, with the processor, cause the apparatus to:
   select said first reference value as a value of a pixel of said first block of pixels located at a first distance from the block boundary; and
   select said second reference value as a value of a pixel of said second block of pixels located at a second distance from the block boundary.

3. An apparatus of claim 1, wherein said block of pixels comprises at least two rows of pixels and at least two columns of pixels, the at least one memory and the computer program code are further configured to, with the processor, cause the apparatus to:
   filter a horizontal block boundary between the first block and the second block first; and
   filter a vertical block boundary between the first block and a third block next.

4. An apparatus of claim 1, wherein said block of pixels comprises at least two rows of pixels and at least two columns of pixels, the at least one memory and the computer program code are further configured to, with the processor, cause the apparatus to:
   filter a vertical block boundary between the first block and the second block first; and
   filter a horizontal block boundary between the first block and a third block next.

5. A method comprising:
   Determining, with a processor, whether two adjacent blocks of pixels of an image have a flat nature;
   using the result of the determining to select a filter among at least a first filter and a second filter for filtering a block boundary between two adjacent blocks of pixels;
   selecting the second filter when said determining indicates that there are two adjacent blocks of pixels having a flat nature;
   selecting at least a first reference value and a second reference value for the second filter, wherein the second filter first reference value is the leftmost value in a filter window and the second reference value is the rightmost value in the filtering window; and
   using said first reference value and said second reference value in filtering the block boundary.

6. The method of claim 5, wherein said block of pixels may comprise at least one row of pixels, and the method further comprising:
   selecting said first reference value as a value of a pixel of said first block of pixels located at a first distance from the block boundary; and
   selecting said second reference value as a value of a pixel of said second block of pixels located at a second distance from the block boundary.

7. The method of claim 5, wherein said block of pixels may comprise at least two rows of pixels and at least two columns of pixels, and the method further comprising:
   filtering a horizontal block boundary between the first block and the second block first;
   filtering a vertical block boundary between the first block and a third block next.

8. The method of claim 5, wherein said block of pixels comprises at least two rows of pixels and at least two columns of pixels, the method further comprising:
   filtering a vertical block boundary between the first block and the second block first; and
   filtering a horizontal block boundary between the first block and a third block next.

9. A non-transitory computer readable storage medium stored with code thereon for use by an apparatus, which when executed by a processor, causes the apparatus to:
   determine whether two adjacent blocks of pixels of an image have a flat nature;
   use the result of the determining to select a filter among at least a first filter and a second filter for filtering a block boundary between two adjacent blocks of pixels;
   select the second filter when said determining indicates that there are two adjacent blocks of pixels having a flat nature;
   select at least a first reference value and a second reference value for the second filter wherein the first reference value is a leftmost value in a filter window and a second reference value is the rightmost value in the filter window; and
   use said first reference value and said second reference value in filtering the block boundary.

10. The computer readable storage medium of claim 9, wherein when said code is executed by the processor, it further causes the apparatus to:
    select said first reference value as a value of a pixel of said first block of pixels located at a first distance from the block boundary; and
    select said second reference value as a value of a pixel of said second block of pixels located at a second distance from the block boundary.

11. The computer readable storage medium of claim 9, wherein said block of pixels comprises at least two rows of pixels and at least two columns of pixels, and when said code is executed by the processor, it further causes the apparatus to perform:
    filter a horizontal block boundary between the first block and the second block first; and filter a vertical block boundary between the first block and a third block next.

12. An apparatus comprising at least one processor and at least one memory including computer program code, the at least one memory and the computer program code configured to, with the processor, cause the apparatus to at least:
   determine whether two adjacent blocks of pixels of an image have a flat nature;
   use the result of the determining to select a deblocking filter among at least a first deblocking filter and a second deblocking filter for filtering a block boundary between two adjacent blocks of pixels;
   select the second deblocking filter when said determining indicates that there are two adjacent blocks of pixels having a flat nature; and
   select at least a first reference value and a second reference value for the second deblocking filter, wherein the first reference value is a leftmost value in a filter window and the second reference value is a rightmost value in the filter window;
   wherein the second deblocking filter is configured for using said first reference value and said second reference value in filtering the block boundary.

13. The apparatus of claim 12, wherein the at least one memory and the computer program code are further configured to, with the processor, cause the apparatus to receive an indication indicative of the nature of the block of pixels.

14. The apparatus of claim 12, wherein the at least one memory and the computer program code are further configured to, with the processor, cause the apparatus to:
   select said first reference value as a value of a pixel of said first block of pixels located at a first distance from the block boundary; and
   select said second reference value as a value of a pixel of said second block of pixels located at a second distance from the block boundary.

15. The apparatus of claim 12, wherein said block of pixels comprises at least two rows of pixels and at least two columns of pixels, the at least one memory and the computer program code are further configured to, with the processor, cause the apparatus to:
   filter a horizontal block boundary between the first block and the second block first; and
   filter a vertical block boundary between the first block and a third block next.

16. The apparatus of claim 12, wherein said block of pixels comprises at least two rows of pixels and at least two columns of pixels, the at least one memory and the computer program code are further configured to, with the processor, cause the apparatus to:
   filter a vertical block boundary between the first block and the second block first; and
   filter a horizontal block boundary between the first block and a third block next.

17. A method comprising:
   Determining, with a processor, whether two adjacent blocks of pixels of an image have a flat nature;
   using the result of the determining to select a deblocking filter among at least a first deblocking filter and a second deblocking filter for filtering a block boundary between two adjacent blocks of pixels;
   selecting the second deblocking filter when said determining indicates that there are two adjacent blocks of pixels having a flat nature; and
   selecting at least a first reference value and a second reference value for the second deblocking filter, wherein the first reference value is a leftmost value in a filter window and the second reference value is a rightmost value in the filter window; and
   using said first reference value and said second reference value in filtering the block boundary.

18. The method of claim 17, further comprising:
   receiving an indication indicative of the nature of the block of pixels.

19. The method of claim 17, wherein said block of pixels may comprise at least one row of pixels, and the method further comprising:
   selecting said first reference value as a value of a pixel of said first block of pixels located at a first distance from the block boundary; and
   selecting said second reference value as a value of a pixel of said second block of pixels located at a second distance from the block boundary.

20. The method of claim 17, wherein said block of pixels may comprise at least two rows of pixels and at least two columns of pixels, and the method further comprising:
   filtering a horizontal block boundary between the first block and the second block first; and
   filtering a vertical block boundary between the first block and a third block next.

21. The method of claim 17, wherein said block of pixels may comprise at least two rows of pixels and at least two columns of pixels, and the method further comprising:
   filtering a vertical block boundary between the first block and the second block first; and
   filtering a horizontal block boundary between the first block and a third block next.

22. A non-transitory computer readable storage medium stored with code thereon for use by an apparatus, which when executed by a processor, causes the apparatus to perform:
   determining whether two adjacent blocks of pixels of an image have a flat nature;
   using the result of the determining to select a deblocking filter among at least a first deblocking filter and a second deblocking filter for filtering a block boundary between two adjacent blocks of pixels;
   selecting the second deblocking filter when said determining indicates that there are two adjacent blocks of pixels having a flat nature;
   selecting at least a first reference value and a second reference value for the second deblocking filter, wherein the first reference value is a leftmost value in a filter window and the second reference value is a rightmost value in the filter window; and
   using said first reference value and said second reference value in filtering the block boundary.

23. The computer readable storage medium of claim 22, wherein when said code is executed by the processor, it further causes the apparatus to receive an indication indicative of the nature of the block of pixels.

* * * * *

UNITED STATES PATENT AND TRADEMARK OFFICE
CERTIFICATE OF CORRECTION

| | |
|---|---|
| PATENT NO. | : 8,848,801 B2 |
| APPLICATION NO. | : 12/986896 |
| DATED | : September 30, 2014 |
| INVENTOR(S) | : Lainema et al. |

It is certified that error appears in the above-identified patent and that said Letters Patent is hereby corrected as shown below:

In the claims:

<u>Column 18,</u>
Line 24, "first;" should read --first; and--.

Signed and Sealed this
Twenty-sixth Day of May, 2015

Michelle K. Lee
*Director of the United States Patent and Trademark Office*